3,317,521
PROCESS FOR THE MANUFACTURE OF N-(5'-NITRO - 2' - FURFURYLIDENE) - 1 - AMINO-HYDANTOIN
Erich Haack, Heidelberg, and Herbert Berger, Sulzberg, Allgau, Germany, assignors to C. F. Boehringer & Soehne G.m.b.H., Mannheim-Waldhof, Germany, a corporation of Germany
No Drawing. Filed Feb. 3, 1964, Ser. No. 342,279
Claims priority, application Germany, Feb. 9, 1963
B 70,678
10 Claims. (Cl. 260—240)

This invention relates to a process for preparing N-(5'-nitro-2'-furfurylidene)-1-amino-hydantoin.

N-(5'-nitro-2'-furfurylidene)-1-amino - hydantoin is a highly effective chemotherapeutic agent which has become known under the trade designations "nitrofurantoin" and "furadantin," and has proved outstandingly effective in all infectious diseases of the urinary tract.

Heretofore, basically only one method has been available for the manufacture of this nitrofuran compound, namely, the reaction of 5-nitrofurfurole or its diacetate with 1-aminohydantoin or its salts. This method has been described in U.S. Patent No. 2,610,181. The method, which is carried out with very dilute aqueous solutions, results in unsatisfactory yields (30–40%). Its principal disadvantage, however, lies in the unavailability of 1-aminohydantoin, and all of the modifications of the "nitrofurantoin" synthesis introduced thus far have all been directed to improvements in the manufacture of this starting material. Conventionally, 1-amino-hydantoin is obtained by the method of Traube and Hoffa (Berichte der deutschen chemischen Gesellschaft 31, 1898, p. 167) by the reaction of hydrazino acetic acid ester with potassium cyanate or from 2-semicarbazido-acetic acid (cf. British Patent 757,822), in which connection the yields amount at the maximum to about 40% of theory. According to the process disclosed in German Patent 1,113,936, somewhat better yields of 1-aminohydantoin are obtained (approximately 60% of theory) by converting a semicarbazone with chloroacetic acid ester. The electrolytic reduction of 1-nitrohydantoin recently suggested in Belgain Patent 616,308 is much too expensive for use in the industrial production of 1-aminohydantoin. All of these processes, however, have the common disadvantage that a condensation with 5-nitrofurfurole has to be carried out in order to obtain the "nitrofurantoin." This aldehyde is relatively unstable and is not suitable for long storage, and the corresponding diacetate is just as photo-sensitive as the free aldehyde (cf. German Patent 1,131,675).

In accordance with the invention, it has now been found that N-(5'-nitro-2'-furfurylidene)-1-aminohydantoin can be manufactured simply and in an economically feasible manner by reacting 5-nitrofurfurole-hydrazone with a halogen acetyl compound of the formula

Hal—CH₂CO—X wherein X is an anisocyanate group or a radical that gives rise under the conditions of the reaction to an isocyanate group, in the presence of an agent which splits off hydrogen halide.

As the halogen acetyl compound, chloroacetyl-isocyanate is preferably used. However, as halogen acetyl compound, there are also suitable those compounds capable of transformation into a halogen acetyl-isocyanate under the conditions of the reaction. Such "isocyanate formers" include, for example, the corresponding carbamic acid halides, urethanes and thiourethanes, and ureas or their reactive substitution products (cf. Houben-Weyl, "Methoden der Organischen Chemie," 4th ed., vol. VIII, pp. 126 et seq.).

Depending on the reactivity of the Hal and X groups present in the starting material, either the one or the other is the first to enter into the action with the 5-nitrofurfurole-hydrazone. If X is a free isocyanate group, it is the more reactive moiety, and in that case there is first formed a 5-nitrofurfurole-4-halogenacetyl-semicarbazone which can be isolated and then cyclized to the hydantoin derivative. In this case, is is best not to add the agent serving for splitting off hydrogen halide until the cyclization process. However, if X is a radical which can be converted into the isocyanate group during the reaction (a urea grouping, for example), it is possible that the halogen acetyl group represents the more reactive part of the molecule, and the condensation will take place at this group before the isocyanate group has become free and can react with the hydrazone. In this case the agent for splitting off hydrogen halide is added at the begining of the reaction.

In order to carry out the reaction of the process of the invention, the components are simply mixed together, preferably in the presence of an inert solvent or suspending agent, as for example, dioxan, nitrobenzene, dimethylformamide. The reaction takes place easily at room temperature. However, in some cases the mixture requires some heating for the reaction to proceed. As the agent for splitting off hydrogen halide, basic condensing agents are used advantageously. Instances of such agents include the conventional inorganic and organic bases, such as, for example, sodium acetate, sodium bicarbonate and, in particular, organic amines such as, for example, triethylamine. The isolation of the N-(5'-nitro-2'-furfurylidene)-1-aminohydantoin from the reaction mixture is carried out by acidifying the reaction mixture and freeing the deacidified mixture of any solvent. Thereafter the residue is recrystallized out of acetic acid or dioxane or out of aqueous methanol solution. The N-(5'-nitro-2'-furfurylidene)-1-amino-hydantoin is obtained in approximately 90% yields.

The following examples illustrate in more detail the present invention without, however, limiting it thereto:

*Example 1*

1.55 g. 5-nitrofurfurole hydrazone were finely pulverized and thereafter suspended in 10 ml. absolute dioxan. 1.43 g. of chloroacetyl-isocyanate were then added at room temperature to the resulting suspension (cf. J. Org. Chem., 27, 1962, p. 3742). A clear solution develops and persists for a short time, and the temperature rises to about 50° C. The mixture is then stirred for 30 minutes and the precipitate separated by suction filtering and washed with some dioxan. In this manner, 2.65 g. of crude 5-nitro-furfurole - chloroacetyl - semicarbazone are obtained in the form of yellow crystals having a melting point of 198–200° C. (decomposition). The yield amounts to 96.6% of theory, with reference to the amount of hydrazone used.

Found: Cl 13.05%; calculated: Cl 12.93%.

1 g. of this substance was dissolved in 6 ml. dimethylformamide. 1.4 ml. triethylamine were added to the resulting solution, and the mixture was heated for 1 hour at 40° C. The mixture was then acidified with 5 N hydrochloric acid to approximately pH 2–3, and carefully evaporated dry using vacuum. The residue melted, after washing with water, at 239–246° C. The yield amounted to 0.82 g. (91.3% of theory referred to the amount of hydrazone used). 0.6 g. of the crude product was recrystallized out of 6 ml. of glacial acetic acid plus water (2:1), with the addition of 0.12 g. of activated charcoal. 0.48 g. of N-(5'-nitro-2'-furfurylidene)-1-amino-hydantoin having a melting point of 257° C. (decomp.) was obtained. The N-(5'-nitro-2'-furfurylidene)-1-amino-hydantoin recovered exhibited no melting point depression

Example 2

1.3 g. of 5-nitrofurfurole-hydrazone were dissolved in 84 ml. dioxan and 1.18 g. of chloroacetyl-isocyanate were added to the resulting solution. The mixture was allowed to stand for an hour, and the precipitated crystals separated by suction filtering and washed with dioxan. In this manner, 1.72 g. (74.8% of theory) of 5-nitrofurfurole-chloroacetyl-semicarbazone having a melting point of 198–200° C. (decomp.) were obtained. 2.5 g. of this compound were cyclized with triethylamine in dimethylformamide solution, as described in Example 1. The yield of N-(5'-nitro-2'-furfurylidene)-1-amino-hydantoin amounted to 2 g. (92.3% of theory, with reference to the hydrazone). The melting point of the N-(5'-nitro-2'-furfurylidene) - 1-amino - hydantoin was 254–255° C. (decomp.). This compound was dissolved in 20 ml. of dioxan, treated with 0.4 g. of animal charcoal, and the clear filtrate vacuum concentrated. The crystals obtained upon cooling melted at 255° C. (decomp.).

Example 3

0.78 g. 5-nitrofurfurole-hydrazone were dissolved in 15 ml. hot nitrobenzene and 0.9 g. chloroacetyl-isocyanate were added at 70° C., whereupon the temperature rose by about 15° C. Shortly thereafter a yellow crystalline product precipitated out from solution and was recovered by suction filtering after 1.5 hours and washed with ether. The yield amounted to 1.2 g. (87.5% of theory) of 5-nitrofurfurole-chloroacetyl-semicarbazone, as a crude product having a melting point of 190–195° C. (decomp.). The cyclization of the purified product was carried out as described above and resulted in the crude N-(5'-nitro-2'-furfurylidene)-1-amino-hydantoin having a melting point of 250–253° C. (decomp.) in practically quantative yield. Following recrystallization from glacial acetic acid plus water (2:1) in the presence of animal charcoal, the desired product having a melting point of 258° C. (decomp.) was obtained in an approximately 80% yield.

We claim:
1. Process for the manufacture of N-(5'-nitro-2'-furfurylidene)-1-amino-hydantoin, which comprises reacting 5-nitrofurfurole-hydrazone with a halogen acetyl compound of the formula

$$Hal-CH_2CO-N=C=O$$

contacting the 5-nitro-furfurole-4-halogen acetyl semicarbazone thereby formed with an agent for splitting off hydrogen halide and recovering the N-(5'-nitro-2'-furfurylidene)-1-amino-hydantoin produced from the reaction mixture.

2. Process according to claim 1, wherein said halogen acetyl compound is chloroacetyl-isocyanate.

3. Process according to claim 1, wherein said agent for splitting off hydrogen halide is a basic compound selected from the group consisting of inorganic and organic bases.

4. Process according to claim 3, wherein said agent for splitting off hydrogen halide is a member selected from the group consisting of sodium acetate and sodium bicarbonate.

5. Process according to claim 3, wherein said agent for splitting off hydrogen halide is triethylamine.

6. Process according to claim 1, which comprises effecting said reaction in the presence of an inert solvent.

7. Process according to claim 6, wherein said solvent is a member selected from the group consisting of dioxan, nitrobenzene, and dimethylformamide.

8. Process for the manufacture of N-(5'-nitro-2'-furfurylidene)-1-amino-hydantoin, which comprises reacting 5-nitrofurfurole-hydrazone with chloroacetyl-isocyanate, contacting the 5-nitro-furfurole-4-chloroacetyl-semicarbazone thereby formed with triethylamine as agent for splitting off hydrogen chloride, and recovering the N-(5'-nitro-2'-furfurylidene)-1-amino-hydantoin produced from the reaction mixture.

9. Process according to claim 8, which comprises effecting said reaction in the presence of dioxan as solvent.

10. Process according to claim 8, which comprises effecting said reaction in the presence of a nitrobenzene as solvent.

No references cited.

WALTER A. MODANCE, *Primary Examiner.*

N. TROUSOF, *Assistant Examiner.*